US009715781B2

(12) United States Patent
Lyons et al.

(10) Patent No.: US 9,715,781 B2
(45) Date of Patent: Jul. 25, 2017

(54) SYSTEM AND METHOD FOR AUTOMATIC EYE TRACKING CALIBRATION

(71) Applicant: Bally Gaming, Inc., Las Vegas, NV (US)

(72) Inventors: Martin S. Lyons, Henderson, NV (US); Bryan M. Kelly, Alamo, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 154 days.

(21) Appl. No.: 14/498,989

(22) Filed: Sep. 26, 2014

(65) Prior Publication Data

US 2016/0093136 A1 Mar. 31, 2016

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3206* (2013.01); *G07F 17/326* (2013.01); *G07F 17/3209* (2013.01); *G07F 17/3237* (2013.01); *G07F 17/3258* (2013.01)

(58) Field of Classification Search

CPC ............. G07F 17/3206; G07F 17/3209; G07F 17/3227; A63F 13/213; A63F 13/22; A63F 13/245; G06F 3/013; G06K 9/00604; A61B 3/113

See application file for complete search history.

(56) References Cited

U.S. PATENT DOCUMENTS

| | | | | |
|---|---|---|---|---|
| 4,836,670 A * | 6/1989 | Hutchinson ............ | A61B 3/113 | 351/210 |
| 4,950,069 A * | 8/1990 | Hutchinson ............ | A61B 3/113 | 351/210 |
| 4,973,149 A * | 11/1990 | Hutchinson ............ | A61B 3/113 | 351/210 |
| 6,637,883 B1 * | 10/2003 | Tengshe ................. | A61B 3/113 | 351/210 |
| 8,457,352 B2 * | 6/2013 | Hennessey ............. | A61B 3/113 | 382/103 |
| 8,885,882 B1 * | 11/2014 | Yin ........................... | G06F 3/00 | 382/103 |
| 2005/0225723 A1 * | 10/2005 | Pilu ........................ | A61B 3/113 | 351/209 |
| 2005/0282603 A1 * | 12/2005 | Parrott .................... | G06F 3/013 | 463/1 |
| 2011/0310006 A1 * | 12/2011 | Edwards ................ | A61B 3/113 | 345/156 |

(Continued)

*Primary Examiner* — Milap Shah

(74) *Attorney, Agent, or Firm* — Seed IP Law Group LLP

(57) ABSTRACT

A system and method is disclosed for calibrating the location of a player's gaze at a video display of a gaming machine. The system and method includes capturing images of the player's gaze with a camera while displaying a plurality of reference symbols at locations on the display during serial display of game video content. Also, a processor creates control signals that represent the direction of the player's gaze relative to the location of the plurality of symbols on the display of the gaming machine. The processor develops a data set based on the control signals and the locations of the plurality of reference symbols to develop a data set. Further, the system and method includes calibrating the location of the player's gaze using the data set with the location s of the plurality of reference symbols on the display.

20 Claims, 14 Drawing Sheets

(56) References Cited

U.S. PATENT DOCUMENTS

| | | | | |
|---|---|---|---|---|
| 2012/0105486 A1* | 5/2012 | Lankford | G06F 3/013 | 345/661 |
| 2012/0272179 A1* | 10/2012 | Stafford | G06F 3/012 | 715/781 |
| 2012/0295708 A1* | 11/2012 | Hernandez-Abrego | A63F 13/424 | 463/36 |
| 2013/0005443 A1* | 1/2013 | Kosta | G07F 17/3206 | 463/25 |
| 2013/0178287 A1* | 7/2013 | Yahav | G02B 27/01 | 463/32 |
| 2013/0286178 A1* | 10/2013 | Lewis | A61B 3/113 | 348/78 |
| 2014/0049452 A1* | 2/2014 | Maltz | G06F 3/013 | 345/8 |
| 2014/0055591 A1* | 2/2014 | Katz | G06F 3/013 | 348/78 |
| 2014/0320397 A1* | 10/2014 | Hennessey | A61B 3/113 | 345/156 |
| 2015/0310657 A1* | 10/2015 | Eden | G06T 13/80 | 705/14.45 |
| 2015/0331485 A1* | 11/2015 | Wilairat | G02B 27/0172 | 345/156 |

* cited by examiner

FIG. 4
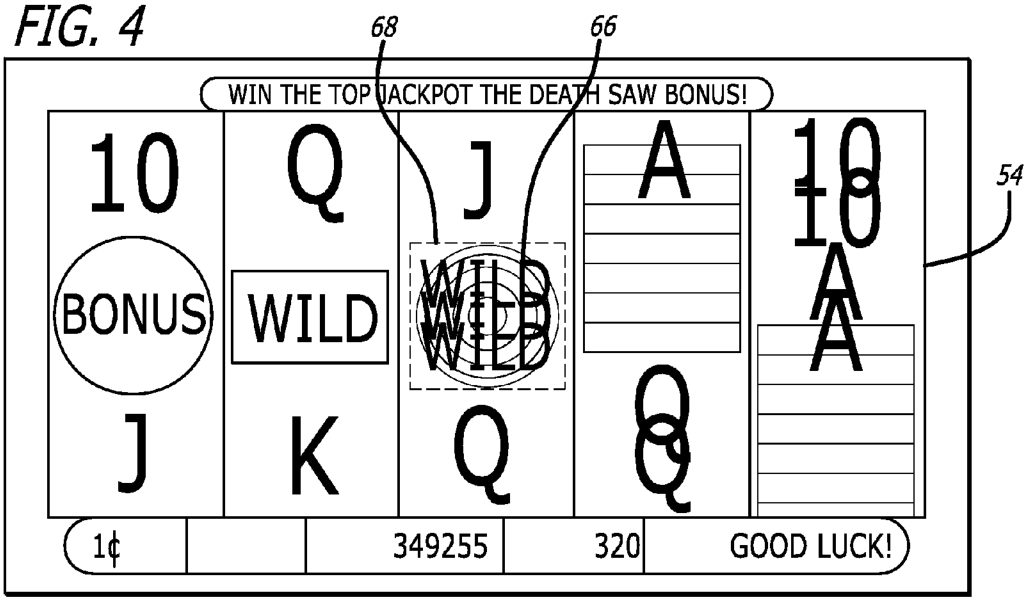
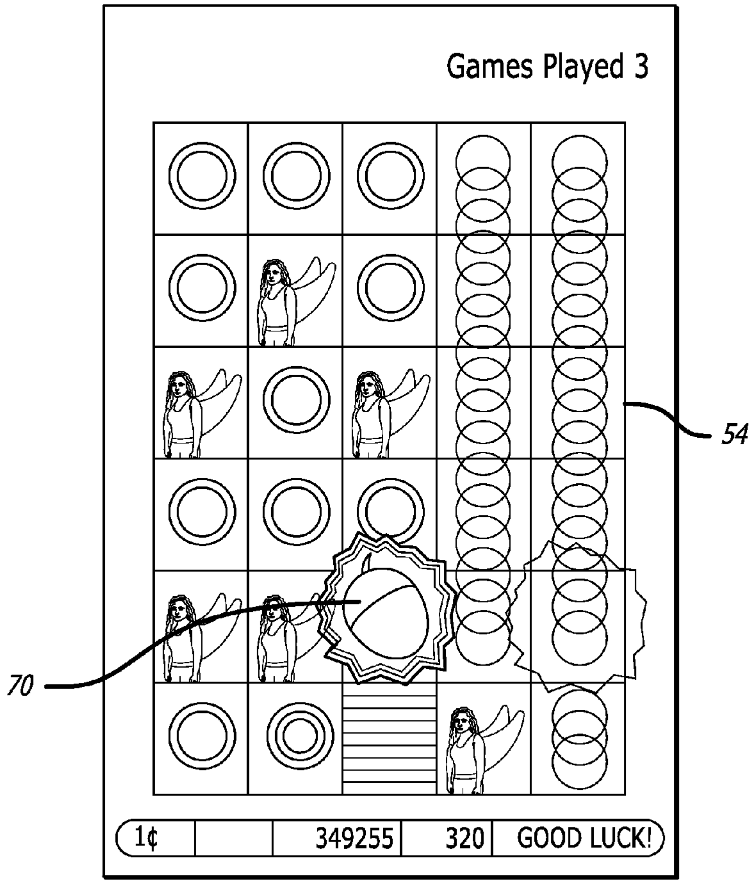
FIG. 5

SYSTEM AND METHOD FOR AUTOMATIC EYE TRACKING CALIBRATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This disclosure pertains generally to a system and method that automatically calibrates eye tracking for a user of a display. More particularly, this disclosure relates to automatically calibrating eye tracking for a player of a gaming machine.

BACKGROUND

Systems and applications for tracking the gaze of a user are known. Typically, such systems include cameras and infrared illumination (IR) mounted proximate to a display and aimed at a user of the display. The IR illuminates the pupils of the eyes of the user and by computing the position and orientation of the eyes with respect to the display, an estimation of where the eye is looking can be derived. Such systems can be very expensive.

Eye-tracker systems generally have two aspects. First, these systems provide eye-tracking as a service, where the position of an element, in (x,y) co-ordinates, on a display that is currently being looked at by the user is available. Once the user focuses on the element, the eye movement is greatly reduced, which is known as a "fixation." The second aspect is the requirement that eye tracker systems must be calibrated for each user because individuals respond differently to visual stimulation in terms of movement and orientation of their eyeballs.

While it may be straightforward to determine the position of the user's eyes with respect to a display, for any degree of accuracy the eye tracking data must be calibrated to take into account the individual user's eye performance. The conventional calibration procedure is to present to the user an otherwise empty display with a circle which moves around the screen to 5 fixed points then pausing and pulsating. This calibration procedure instructs the user to focus or fixate on the circle at each fixed point on the screen. During this procedure, the eye tracker measures characteristics of the user's eyes and uses them together with an internal, physiological 3D eye model to calculate the gaze data. This model includes information about shapes, light refraction and reflection properties of the different parts of the eyes (e.g. cornea, placement of the fovea, etc.). The problem with this calibration procedure is that it is visually boring, and more importantly, makes the user very aware that their eyes are being tracked.

Thus, what is needed is a system and method to perform the calibration processes required for tracking eye movement without a user being aware, and in a much more visually appealing manner. In this way, tracking may be used with gaming machines without the user knowing that an eye tracking calibration process is being performed.

SUMMARY

Briefly, and in general terms, disclosed herein are systems and methods for calibrating the location of a user's or player's gaze at a video display. One embodiment of a method includes providing game play on a display of a gaming machine including the serial display of game video content having a plurality of reference symbols and non-reference symbols displayed on the display. The plurality of reference symbols may have a greater significance to the game play on the gaming machine than the non-reference symbols displayed on the display of the gaming machine. The reference symbols may help calibrate the player's gaze by providing a point of focus for the player. Images of the player's gaze may be captured while displaying at least one of the plurality of reference symbols at locations on the display during the serial display of the game video content. Either the left eye, right eye, or both the left and right eyes of the player may be captured when at least one reference symbol is displayed on the gamine machine. Images of the player's eyes may also be captured before the reference symbol is displayed. Control signals are then created that represent the direction of the player's gaze relative to the location of the plurality of reference symbols, and the control signals and locations of the plurality of reference symbols are processed to develop a data set. The data set is used to calibrate the location of the player's gaze at a location on the display. In one embodiment, the data set may be saved in a player profile on a server that may be accessed by multiple gaming machines.

In one embodiment the serial display of the game video content includes a spinning reel game. In this embodiment, at least one of the plurality of reference symbols may be a Wild symbol, a Jackpot symbol, or the like. Also, at least one of the plurality of reference symbols may be an animation. In one embodiment, an audio sound may be played through speakers on the gaming machine and the method may include capturing images of the player's gaze while providing the audio output. The audio sound may be played in conjunction with the display of a reference symbol, such as an animation.

In another embodiment a method for tracking the location of a player's eye at a video display includes providing game play on a display of a gaming machine. The game play includes the serial display of game video content. The method also includes capturing images of the player's eye during game play and storing the captured images of the player's eye when an indicator for a calibration point occurs on the display of the gaming machine during game play. The player's left eye, right eye, or both eyes may be captured when the indicator for a calibration point occurs on the display. Further, the method includes creating control signals representing the location of the player's eye relative to the location of the indicator on the display of the gaming machine, and processing the control signals and the location of the indicator on the display to develop a data set. The data set is used to calibrate the location of a gaze of the player's eye at the display of the gaming machine. In this way, the calibration for an eye tracking system on a gaming machine may occur during normal game play. The player may be unaware that the gaming machine is calibrating the player's gaze.

By way of example only, the indicator for the calibration point may be a special gaming symbol with a greater significance to the game play on the gaming machine than a non-special gaming symbol on the display of the gaming machine. The special gaming symbol may be a Wild symbol, a Jackpot symbol, or the like. Further, the special gaming symbol may be an animation. Still further, in one embodiment, the display of the gaming machine may be a touch display and the indicator for the calibration point may be the location of a touch on the touch display screen.

In one embodiment, the method may include storing captured images of the player's eye preceding the occurrence of the indicator for the calibration point. As an example, images of the player's eye may be stored about 0.5 seconds or about 1.0 seconds before the occurrence of the indicator for the calibration point. Further, the method may include saving the data set in a profile for the player on a server that may be accessed by multiple gaming machines.

The disclosed embodiments further relate to a system for calibrating a player's gaze during game play that may include a gaming machine having a display. The gaming machine may provide game video content on the display, and the gaming machine may provide a plurality of reference symbols and non-reference symbols on the display during game play. The reference symbols have a greater significance to game play than the non-reference symbol. The system also includes a camera positioned adjacent to the display of the gaming machine, wherein the camera captures images of the player's gaze when at least one of the plurality of reference symbols is displayed on the display of the gaming machine. Also, a memory device in communication with the camera stores images of the player's gaze when at least one of the plurality of reference symbols is displayed. A processor in communication with the gaming machine and the memory device creates a data set based on the stored images and the location on the display of the at least one of the plurality of reference symbols, wherein the data set represents a location at the display of the player's gaze. In one embodiment, the memory device and processor may be associated with a remote server, and the remote server may be in communication with multiple gaming machines. Further, the memory device may store the data set created by the processor in a profile for the player.

Further advantages of the disclosed embodiments will be brought out in the following portions of the specification, wherein the detailed description is for the purpose of fully disclosing the various embodiments without placing limitations thereon.

While the disclosed embodiments are described with reference to gaming machines in a casino environment, it should be understood that it may apply as well to the use of any display.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

FIG. 4 illustrates a screen shot taken from a display of a gaming machine displaying the spinning reel game of FIGS. 2 and 3 with the first, second and third reel stopped, with each reel showing a special symbol.

FIG. 5 illustrates another example of a screen shot taken from a gaming machine having animated symbols that may be used as fixation points.

DETAILED DESCRIPTION

Figure 1:
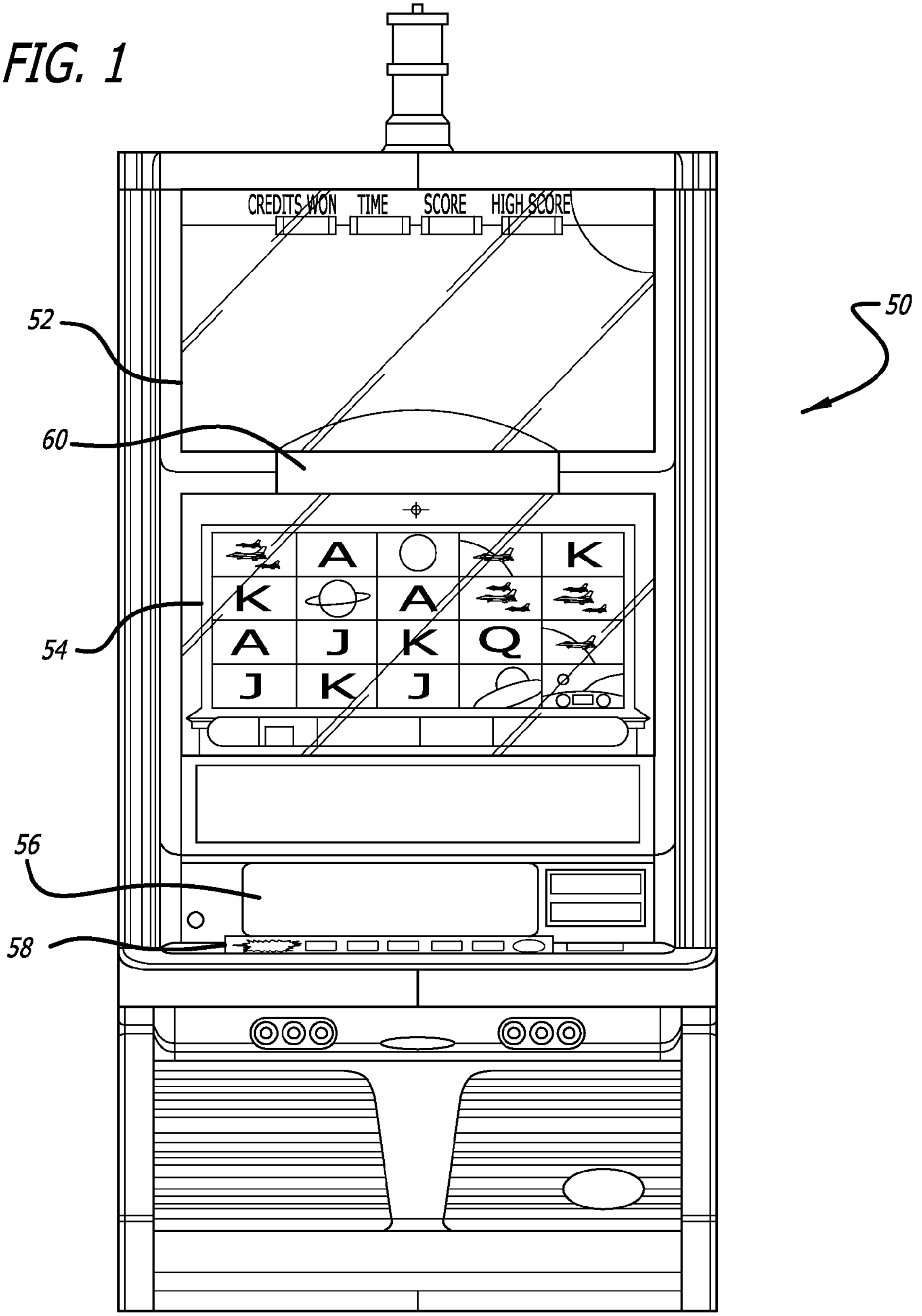
FIG. 1 illustrates a front view of a gaming machine including an eye tracker assembly.

Persons of ordinary skill in the art will understand that the present disclosure is illustrative only and not in any way limiting. Other embodiments of the presently disclosed system and method readily suggest themselves to such skilled persons having the benefit of this disclosure.

Each of the features and teachings disclosed herein can be utilized separately or in conjunction with other features and teachings to provide a system and method for calibrating eye tracking of a player on a gaming machine. Representative examples utilizing many of these additional features and teachings, both separately and in combination, are described in further detail with reference to the attached figures. This detailed description is merely intended to teach a person of skill in the art further details for practicing the present teachings and is not intended to limit the scope of the claims. Therefore, combinations of features disclosed below in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIGS. 1-9 illustrate various embodiments of the disclosed automatic calibration system and method for tracking eye movement at a gaming display. FIG. 1 shows an example of a gaming machine or electronic gaming machine (EGM) 50 including a top screen 52, a main display 54, an iView display 56, an iDeck 58, and other features. This embodiment also includes an eye tracker assembly 60 installed proximate to the display. The eye tracker assembly 60 may be installed below or above a display. In the embodiment shown in FIG. 1, the eye tracker assembly is positioned above the main display. In other embodiments, the eye tracker assembly may be positioned on either side of the display. Further, multiple eye tracker assemblies may be positioned around the display. Still further, the eye tracker assembly may be positioned anywhere in the venue, such as in the ceiling or on a wall or on a post near the EGM as long as the view from the eye tracker assembly to the face of the player is unobstructed.

By way of example only, and not by way of limitation, the eye tracker assembly 60 may include one or more cameras and an infrared illumination (IR) device. The IR device illuminates the pupils of the eyes of the user, enabling the system to compute the position and orientation of the eyes with respect to the display when images of the eyes are captured by the camera(s) of the eye tracker assembly. Calculating the position and orientation of the pupils of the eyes may provide an estimation of where the eye is looking on the display. The eye tracker assembly 60 may be in communication with an iView CPU 1213 and/or a game monitoring unit GMU 1207, both of which are shown in FIG. 11A . The eye tracking assembly 60 also may be in communication with the Ethernet switch 1231, shown in FIG. 12B, such that the eye tracker assembly can communicate with remote servers and remote storage devices. The eye tracking assembly 60 may be easy to retrofit on an existing gaming machine, such as the gaming machine shown in FIG. 10. Also, being in communication with the iView allows the information collected concerning the calibration of a player's eyes to be stored in a player tracking information.

Referring now to FIG. 1, a slot game is shown on the main display 54 of the EGM 50. By way of example only, and not by way of limitation, automatically calibrating eye tracking for a slot game will be discussed, with the understanding that the disclosed system and method for automatically calibrating eye tracking may be used with any game. Further, the system and method for automatically calibrating eye tracking may be used with game video content shown on a display. Using a slot game as an example, elements appear at fixed locations on the display that may be used for calibrating eye tracking For example, the window of reel symbols is usually fixed and has a known layout. Usually the (x,y) coordinates of the fixation point, such as a symbol, are known to the EGM. Also, elements of a slot game may be predicted to appear by the game software before they appear on the display to the player. This is advantageous for use in calibrating eye tracking because the time the element appears on the screen is known to the EGM. Elements of a slot game may be associated with touch input, which is also advantageous to calibrating eye tracking because players would likely fixate their eyes on a position they are going to touch on the display and the EGM would know the location of the touch of the player. This embodiment uses this information to produce calibration data for eye tracking, without the need for an overt calibration step.

This embodiment of a system and method for performing automatic calibration of eye tracking includes multiple phases. One aspect of this embodiment includes determining coordinates of a visual element on the display that is likely to be fixated upon before the element is displayed to the player. The system for performing automatic calibration of eye tracking also includes collecting the eye tracking or gaze data. By way of example only, with the position of the fixation point (e.g., a symbol) known to the EGM, the eye tracking assembly may use the IR device to illuminate the pupils of the eyes of the player while at least one camera of the eye tracking assembly captures images of the player's eyes. These images may be used to compute the position and orientation of the eyes with respect to the display. Calculating the position and orientation of the pupils of the eyes may provide an estimation of where the player's eyes are looking on the display. Once the eye tracking assembly 60 measures characteristics of the player's eyes, the eye tracking assembly may use these characteristics together with an internal, physiological 3D eye model to calculate the gaze data for an individual player. The gaze data created by the eye tracking assembly may be transformed into control signals representing the direction of the player's gaze relative to the location of the plurality of reference symbols. This procedure may be performed by the gaming machine or a remote server. The 3D eye model may include information about shapes, light refraction, and reflection properties of the different parts of the eyes (e.g. cornea, placement of the fovea, etc.). With this information, the eye tracking assembly is able to calibrate a player's gaze. This calibration data may be added to a collection of data to determine the characteristics of the player's eye movement.

Figure 2:
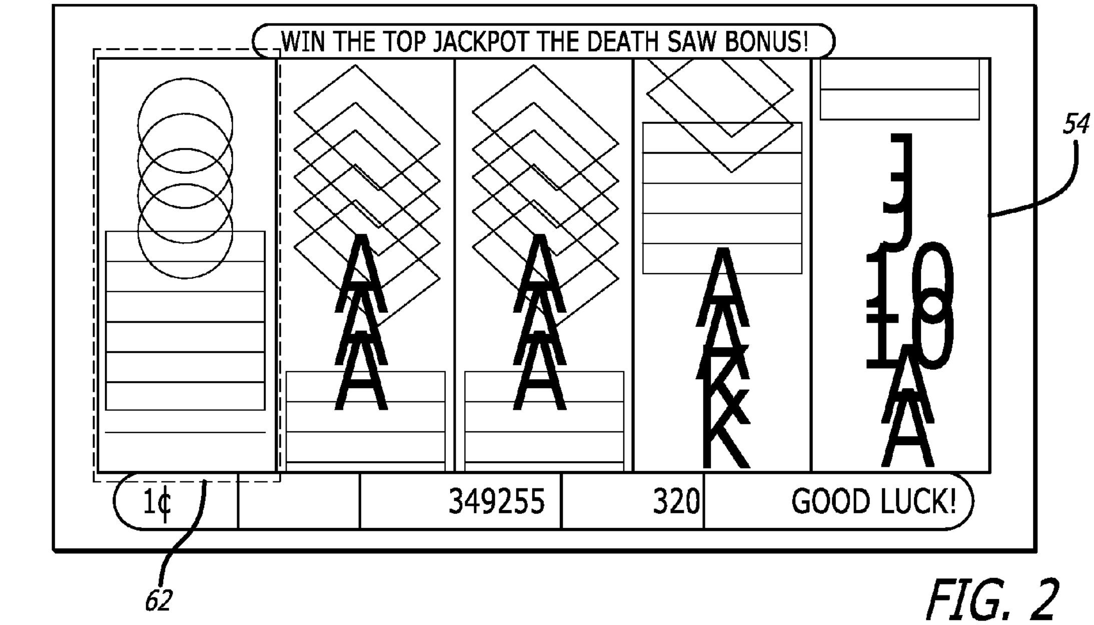
FIG. 2 illustrates a screen shot taken from a display of a gaming machine displaying a spinning reel game with five reels spinning

FIG. 2 shows an example of the first phase of the current embodiment. In this example, the game "David Copperfield", the reels are spinning as depicted in FIG. 2. When the reels are spinning or appear to be spinning fast, a user may not fixate his eyes on any particular visual element. It may be concluded that the player would initially look in the direction of the first reel, as players generally follow each reel from left to right as they stop. In this example, the first reel becomes the fixation area 62.

Figure 3:
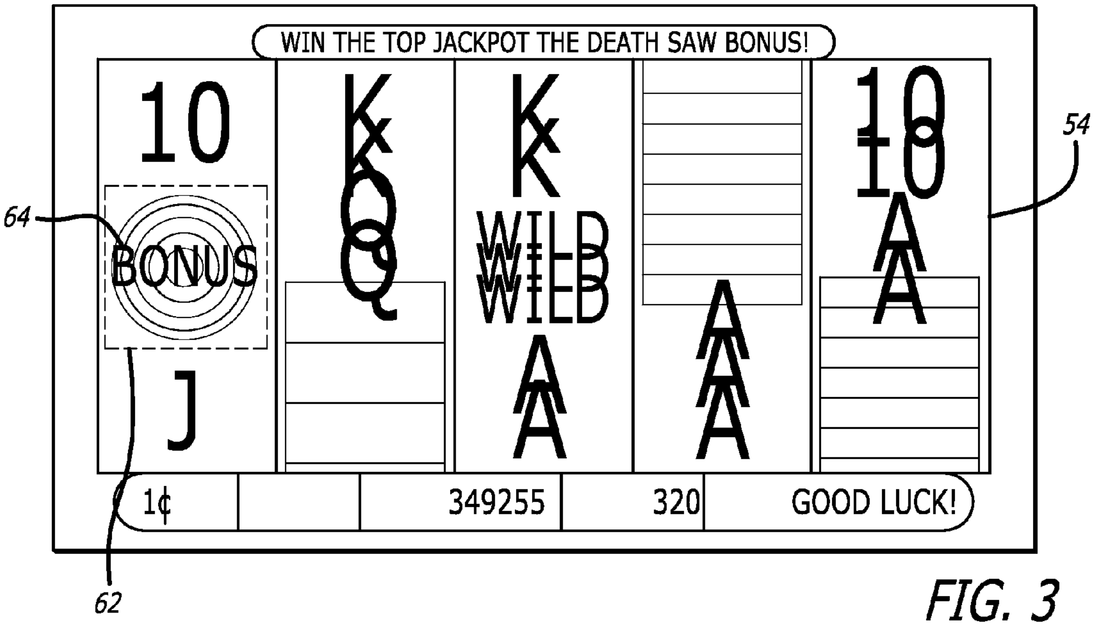
FIG. 3 illustrates a screen shot taken from a display of a gaming machine displaying the spinning reel game of FIG. 2 with the first reel stopped and showing a bonus symbol.

FIG. 3 depicts a point during the reel spin at which eye tracking or gaze data may start to be accumulated for calibration. While reels 2-5 are still spinning, reel 1 has stopped spinning and hit a bonus symbol 64 on the center line. It may be expected with a high degree of certainty that such a visual element (the bonus symbol 64) will immediately be focused on by the player, because of its importance within the game. The bonus symbol is one example of a special reference symbol or indicator that can be used as a calibration point. Thus, this embodiment begins accumulating eye tracking (gaze) data, including collecting images of the player's eyes, for calibration at the instant the first reel stops. Gaze data also is accumulated when any reel stop includes a significant animated symbol. The collected gaze data is stored and passed into the calibration engine with a calibration position of the center of the significant symbol.

In this embodiment, the collection of gaze data stops soon after the reel with a significant symbol appears, for example, about 0.5 seconds or about 1.0 seconds. In one embodiment, the collection of eye tracking or gaze data stops after a second significant symbol 66 appears in a second fixation area 68 as shown in FIG. 4. Once the significant symbol 66 appears, the system may begin collecting additional eye tracking or gaze data related to the position of significant symbol 66 for a specific amount of time or until another event occurs.

In certain embodiments, game design decisions may be made to accentuate fixation for the purposes of calibration of eye movement. First, rather than animating each symbol within a winning combination simultaneously, the system may animate each symbol in turn, in one embodiment. Gaze data is then acquired with calibration positions at the center of each animating symbol in turn, as the player's eye subconsciously tracks the animation from symbol to symbol. Second, the number of significant symbols may be increased in order to maximize the amount of eye tracking or gaze data being collected in an efficient manner.

Figure 6:
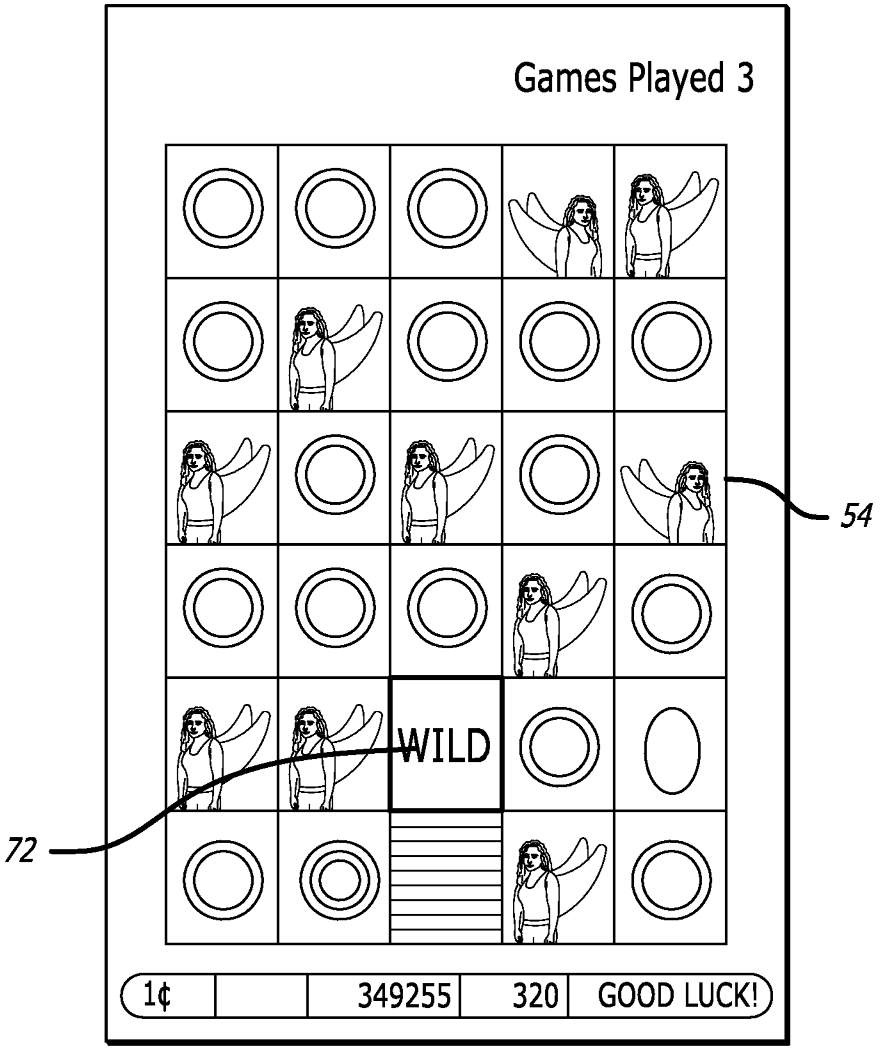
FIG. 6 illustrates yet another example of a screen shot taken from a gaming machine showing a wild symbol that may be used as a fixation point.

FIG. 5 is an example of such a game currently produced by Bally, "Acorn Pixie." In FIG. 5, the main display 54 shows that a set of free games has occurred. During free games in this example, the reels spin, but as the reels spin an "acorn" symbol 70 appears and moves over a symbol. It remains in the same position over the symbol until the end of the spin, at which point it disappears, revealing the word "Wild" and a piece of an underlying picture as shown in FIG. 6. The "acorn" symbol is in its position for 2 or 3 seconds, and due to its value in the game and anticipation aspects it can be expected with a high degree of probability that this would be the fixation point 72 for any player paying attention to the game. As such, in this embodiment, the "acorn" symbol 70 is marked as a calibration point, and as it appears, its position along with time-associated gaze data (images and data associated with the location and stare of the player's eyes) is stored and passed to the system for use as calibration data. These examples are visual elements that players may not even be aware they are looking at, and there are other visual elements that players make conscious decisions to look at because they are associated with touch input.

Figure 7:
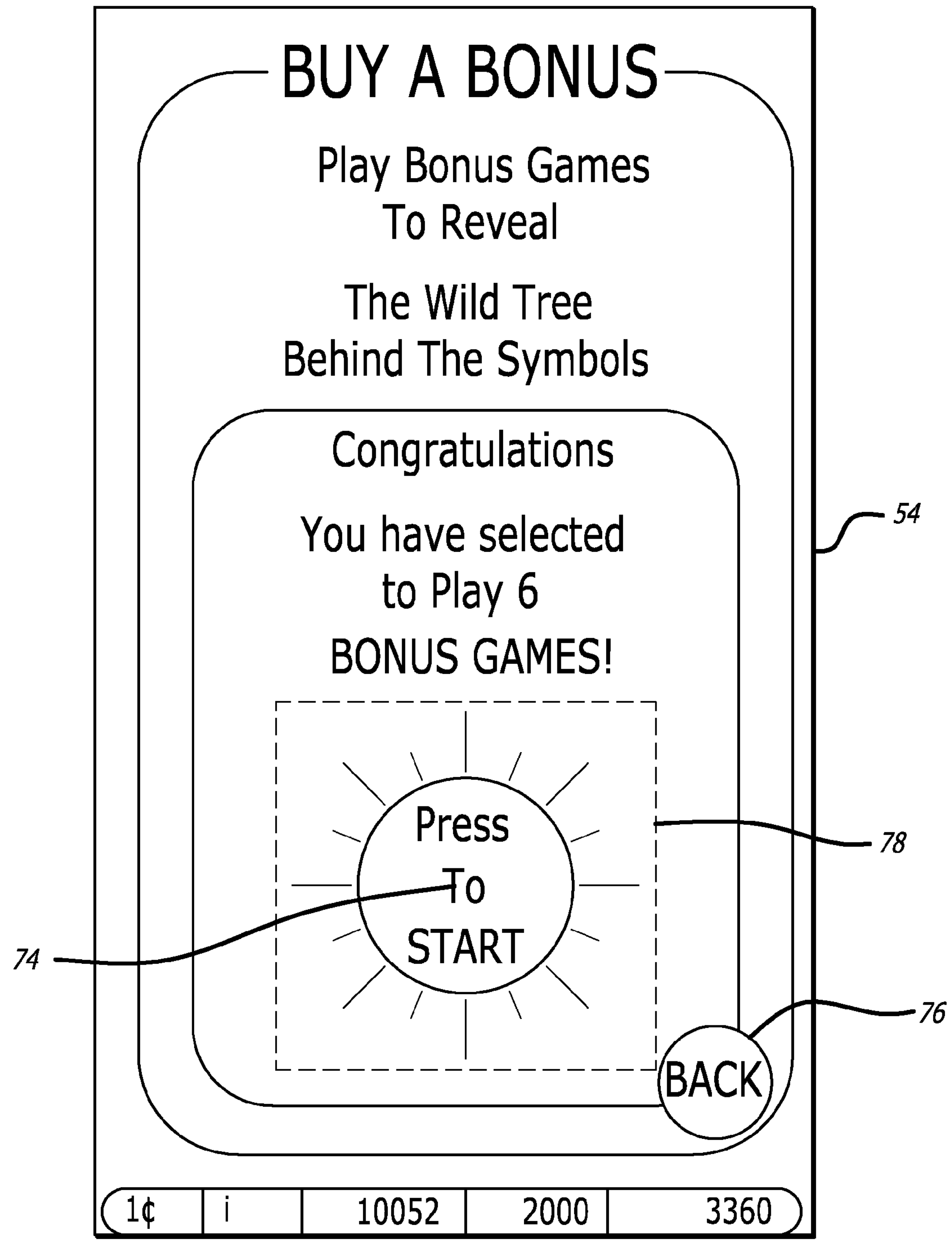
FIG. 7 illustrates a screen shot of a gaming machine having a touchscreen display, wherein the area surrounding a button on the touchscreen may be a fixation area for calibrating a player's gaze.

FIG. 7 shows another display from the game "Acorn Pixie". The player has elected to buy bonus games, and is given a touchscreen button 74 to press to start playing, along with another button to "back" 76. In this example, the touch input 74 may be used as a fixation area 78 because of the heuristic data, which supports that players, in general, fixate on a touchscreen button as they use their finger to touch the touchscreen. Touch input 76 could also become a fixation area if the user selects the "back" button. Eye tracking or gaze data can start to be collected when the player touches the start button 74 and ends after a certain period or when the player stops touching the start button 74.

Figure 8:
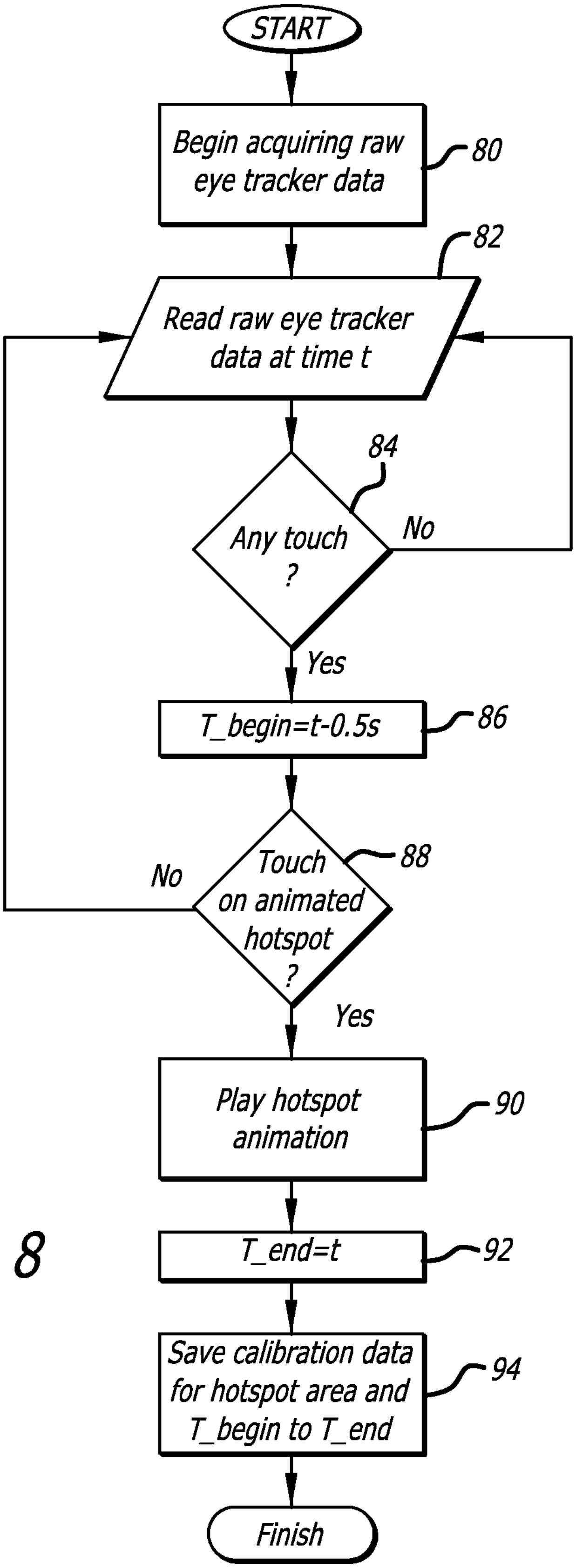
FIG. 8 illustrates an example of a process for using touchscreen data to acquire data for calibrating eye tracking of a user of a touchscreen display.

FIG. 8 depicts an example of a process that may use touchscreen data to acquire calibration data for eye tracking In one embodiment, gaze data or images of the player's eyes may constantly be acquired by the camera of the eye tracking assembly 60. At step 80, the eye tracking assembly 60 begins acquiring raw eye tracker data. As discussed above, this may include images of the player's eyes to capture the location of the player's eyes. When a touch on the touchscreen is received, it is not just the gaze data going forward that is used as input to the calibration system; rather, the system may use the historical gaze data for a preceding interval, for example, about 0.5 seconds or about 1.0 seconds before the touch. This is shown at steps 82, 84, and 86 when the system sets T_begin to t (the time the touch occurred) minus 0.5 seconds. If no animation results from touching the screen, the system sets T_end to the time to player touched the screen.

In another embodiment, if no animation or other effect results from the touch, T_end may not be set and the system may continue to collect data until a more significant event such as an animation results from a touch to the touchscreen. At step 88, if the touch results in a visual effect such as an animation or particle effect on the display screen, the EGM plays the animation at step 90 and the system sets T_end to t (the time the touch occurred) at step 92.

In still another embodiment, the system may set T_end to the time the animation stops playing. A favored user interface design necessitates that a touch of a touchscreen should immediately be followed by visual feedback to confirm the touch, but it is not required that a function (such as revealing a prize from a "pick-em" selection screen) be immediate. Rather, there may be some animation of the prize being revealed. Thus, gaze data can be accumulated for calibration through the animation period. At step 94, the system saves the calibration data specific to the fixation area (location on the screen that was touched by the player) from T_begin to T_end.

In yet another embodiment, the system may acquire calibration data during an animated visual effect of a superstitious element within the user interface. This has been described in U.S. Patent Pub. No. 2011036416, entitled "Superstitious Gesture Influenced Gameplay," and is hereby incorporated by reference. These innocuous visual feedback elements, not related to gameplay, can nevertheless be used as pointers for gaze data.

In another embodiment, the system can acquire calibration data during audio cues from the EGM. Using a speaker or stereo system, an audio cue may be played at such a time that a player is drawn to a certain element on screen. Soon after the audio cue begins and the element is displayed in conjunction with the audio cue, gaze data (including images of the player's eyes) may be accumulated for the position of the element appearing during the audio cue for a period of time. Again, this period may be about 0.5 seconds or longer.

A number of calibration points or events are required before accurate eye tracking can occur. All of these calibration events may be combined into one calibration interaction. In one embodiment, a number of events may occur over a period throughout gameplay, with the eye tracking system gradually building up a more accurate calibration profile.

For example, possible values for eye tracking calibration can include no eyes tracked, both eyes tracked, only one (left or right) eye tracked. If only one eye is tracked the system may be able to identify which eye, left or right, was tracked, or the system may be unsure which eye was tracked. In one embodiment, the system may only use gaze data packets where the eye tracker is confident to a certain degree about which eye(s) is being tracked. As an example, this means that gaze data for the left eye may only be used when the system identifies that both eyes are tracked, only the left eye is tracked, or the system knows to a degree of certainty that the left eye is tracked. Similarly, gaze data for the right eye may be used when the system identifies that both eyes are tracked, only the right eye is tracked, or the system knows to a degree of certainty that the right eye is tracked.

Figure 9:
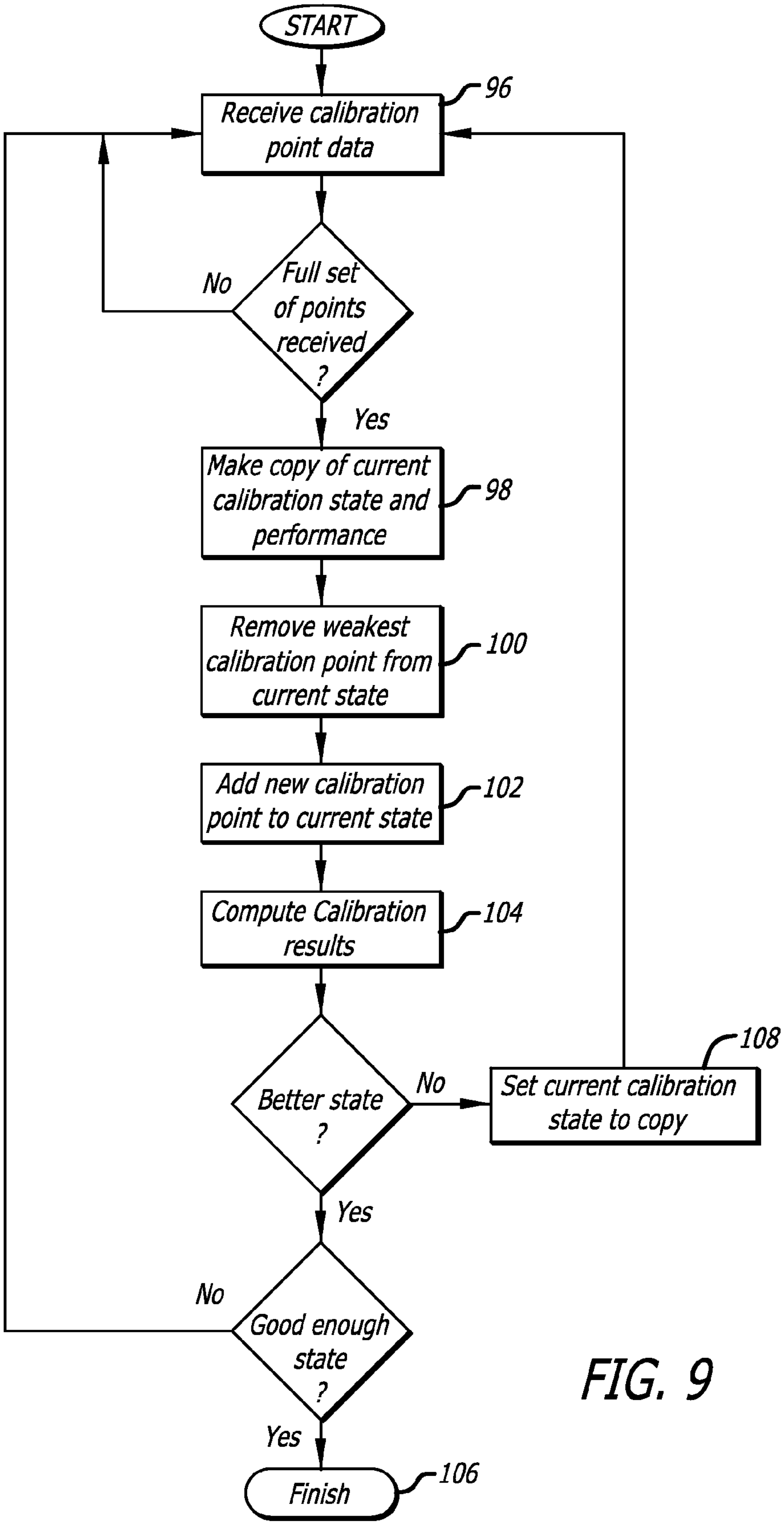
FIG. 9 illustrates an example of a process for improving the calibration of a player's gaze.

FIG. 9 shows an example of a process of how a calibration profile may be gradually improved as calibration events (such as bonus symbols appearing) occur. The system receives calibration data for multiple events at step 96. If the system has a full set of data points to calibrate an individual player's eye movement, then at step 98 the system makes a copy of the current calibration state and performance. Each time a calibration event occurs thereafter, the existing calibration data set is analyzed, and as long as it contains enough events to begin with, the weakest member of the data set is removed at step 100. Determination of the weakest member may be based upon a number of factors. For example, the size of the spread of raw gaze data could indicate how fixated the user was (with a small spread being better), or the shortness of time of event may indicate that the fixation was only momentarily, and therefore, less accurate. This weakest member is temporarily removed from the calibration set, and replaced with the new calibration event at step 102.

Calibration is then recomputed with the new set at step 104, and if it results in a better state (for example, moves the response code from no eyes tracked to one eye tracked (probably right eye)), then the new set is stored. If this state of the eye tracking calibration is sufficient to operate the eye tracking software, then the calibration phase ends at step 106. If the recomputed calibration results in a worse state (for example, moves the response code from one eye tracked (probably left) to no eyes tracked), then the system sets the current calibration state to the previous calibration state that was copied at step 108. If the calibration state is reset, then the calibration phase of the eye tracker assembly continues until a sufficient state (e.g. both eyes tracked) is achieved. Once this occurs, calibration may end for the gameplay session and eye-tracked gameplay or other elements can be activated.

In one embodiment, a game utilizing eye-tracked gameplay features employs these features as alternative method of input, or as features that may be swapped out for non-eyetracked features before calibration is achieved. Once calibration is achieved, it is desirable to associate this information with the player so that calibration is not required in future. One method for achieving this association is to use a save state service to associate calibration data with a player tracking or other profile via the iView system. When the player cards out, the calibration data is reset for the next player, and when the player cards back in, the calibration data is re-read and activated from their profile. In certain embodiments, even if a player's profile includes eye tracking calibration data, the system may recalibrate in order to improve the calibration data for the player.

Other ways of associating players with eye tracking data may include facial recognition or other biometrics. Calibration also may be reset when a player is no longer at the EGM. This may be detected by the eye tracker showing a status of no eyes tracked for a suitable with no credits in the EGM.

Use of an eye tracking assembly may result in interesting features being built into games or other applications. As an example, entertainment features such as "popping" a symbol off of the screen may be caused by the player fixating on the symbol for a small amount of time (say 0.25 seconds). In another example, a 3D fly-through scene may have the direction of travel influenced by the users' fixation, such that a branch point is automatically be chosen based upon fixation. Also, a game may appear to "read your mind" where a number of boxes (or other indicia) appear on the screen and the EGM asks the player to open a box by concentrating on one box. The eye tracking assembly may then be used to "open" the box on which the player is fixated. The eye tracking assembly may also provide context-sensitive help. For example, if a player is fixating on an element of a game for too long, such as a particular card within a hand of cards in Video Poker, the game may use fixation data to present information such as "Holding this card is better strategy."

In one embodiment, eye tracking data may be stored and analyzed at a later date to judge the impact of visual elements within the game. Further, emotional state (engagement) and even heartbeat rate can be read from eye tracker assembly based upon pupil dilation and fixation times. This may be used to adjust game audio levels and visual effect intensity.

Figure 10:
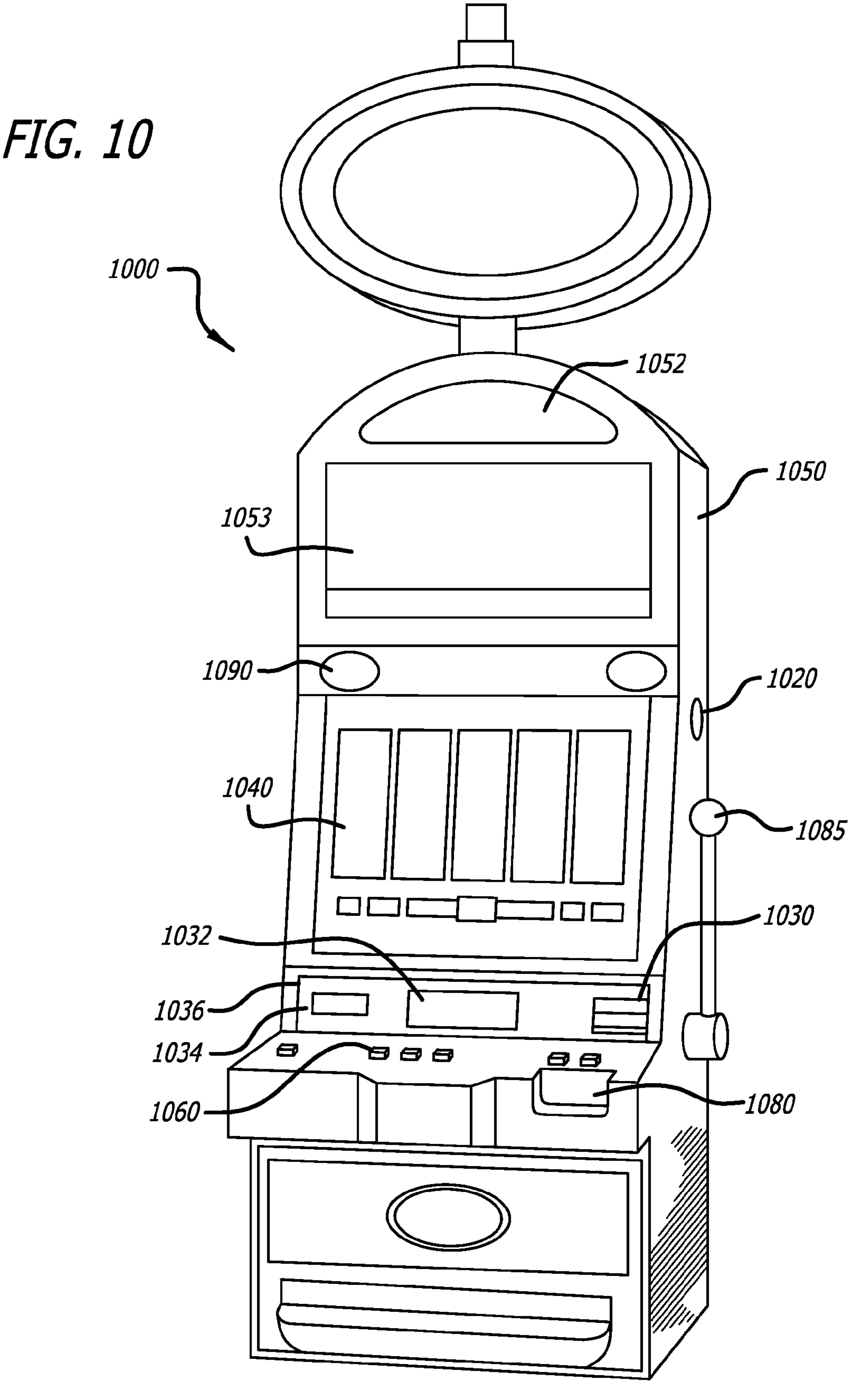
FIG. 10 illustrates a perspective view of a gaming machine in accordance with one or more embodiments.
Figure 11A:
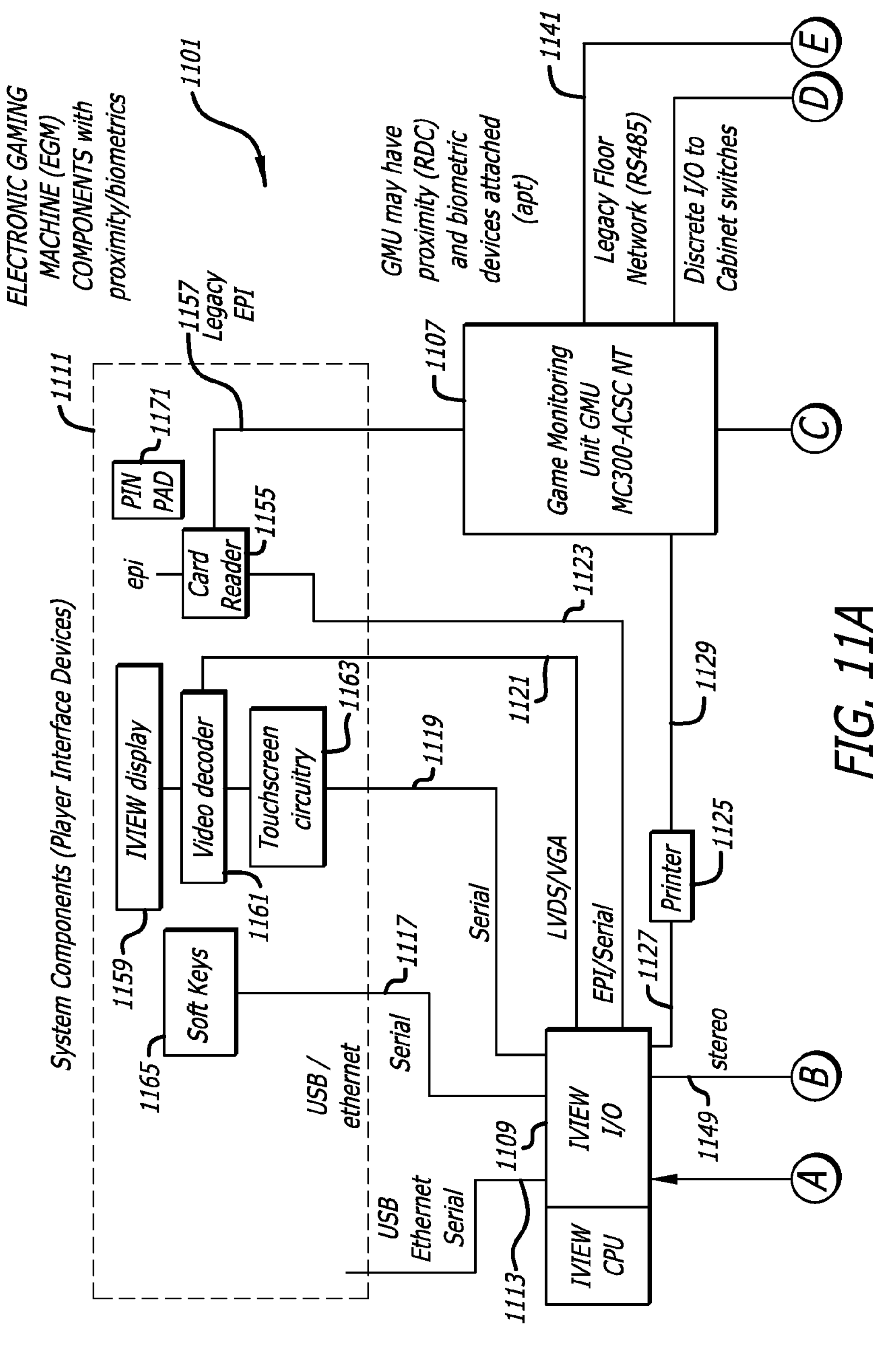
FIG. 11A illustrates a block diagram of the physical and logical components of the gaming machine of FIG. 1 in accordance with one or more embodiments.

Referring to FIG. 10, gaming machine 1100 capable of supporting various embodiments described above is shown, including cabinet housing 1120, primary game display 1140 upon which a primary game and feature game may be displayed, top box 1150 which may display multiple progressives that may be won during play of the feature game, player-activated buttons 1160, player tracking panel 1136, bill/voucher acceptor 1180 and one or more speakers 1190. As discussed above the gaming machine 1100 may also include an eye tracking assembly 60 as shown in FIG. 1. Cabinet housing 1120 may be a self-standing unit that is generally rectangular in shape and may be manufactured with reinforced steel or other rigid materials which are resistant to tampering and vandalism. Cabinet housing 1120 may alternatively be a handheld device including the gaming functionality as discussed herein and including various of the described components herein. For example, a handheld device may be a cell phone, personal data assistant, or laptop or tablet computer, each of which may include a display, a processor, and memory sufficient to support either stand-alone capability such as gaming machine 1100 or thin client capability such as that incorporating some of the capability of a remote server.

In one or more embodiments, cabinet housing 1120 houses a processor, circuitry, and software (not shown) for receiving signals from the player-activated buttons 1160, operating the games, and transmitting signals to the respective displays and speakers. Any shaped cabinet may be implemented with any embodiment of gaming machine 1100 so long as it provides access to a player for playing a game. For example, cabinet 1120 may comprise a slant-top, bar-top, or table-top style cabinet, including a Bally Cinevision™ or CineReels™ cabinet. The operation of gaming machine 1100 is described more fully below.

The plurality of player-activated buttons 1160 may be used for various functions such as, but not limited to, selecting a wager denomination, selecting a game to be played, selecting a wager amount per game, initiating a game, or cashing out money from gaming machine 1100. Buttons 1160 may be operable as input mechanisms and may include mechanical buttons, electromechanical buttons or touch screen buttons. Optionally, a handle 1185 may be rotated by a player to initiate a game.

In one or more embodiments, buttons 1160 may be replaced with various other input mechanisms known in the art such as, but not limited to, a touch screen system, touch pad, track ball, mouse, switches, toggle switches, or other input means used to accept player input such as a Bally iDeck™. One other example input means is a universal button module as disclosed in U.S. Patent Publication No. 20060247047, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 1120 may optionally include top box 1150 which contains "top glass" 1152 comprising advertising or payout information related to the game or games available on gaming machine 1100. Player tracking panel 1136 includes player tracking card reader 1134 and player tracking display 1132. Voucher printer 1130 may be integrated into player tracking panel 1136 or installed elsewhere in cabinet housing 1120 or top box 1150.

Game display 1140 may present a game of chance wherein a player receives one or more outcomes from a set of potential outcomes. For example, one such game of chance is a video slot machine game. In other aspects of the embodiments, gaming machine 1100 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 1140 is, typically, a CRT or a flat-panel display in the form of, but not limited to, liquid crystal, plasma, electroluminescent, vacuum fluorescent, field emission, or any other type of panel display known or developed in the art. Game display 1140 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 1140 may also present information such as, but not limited to, player information, advertisements and casino promotions, graphic displays, news and sports updates, or even offer an alternate game. This information may be generated through a host computer networked with gaming machine 1100 on its own initiative or it may be obtained by request of the player using either one or more of the plurality of player-activated buttons 1160; the game display itself, if game display 1140 comprises a touch screen or similar technology; buttons (not shown) mounted about game display 1140 which may permit selections such as those found on an ATM machine, where legends on the screen are associated with respective selecting buttons; or any player input device that offers the required functionality.

Cabinet housing 1120 incorporates a single game display 1140. However, in alternate embodiments, cabinet housing 1120 or top box 1150 may house one or more additional displays 1153 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 11B:
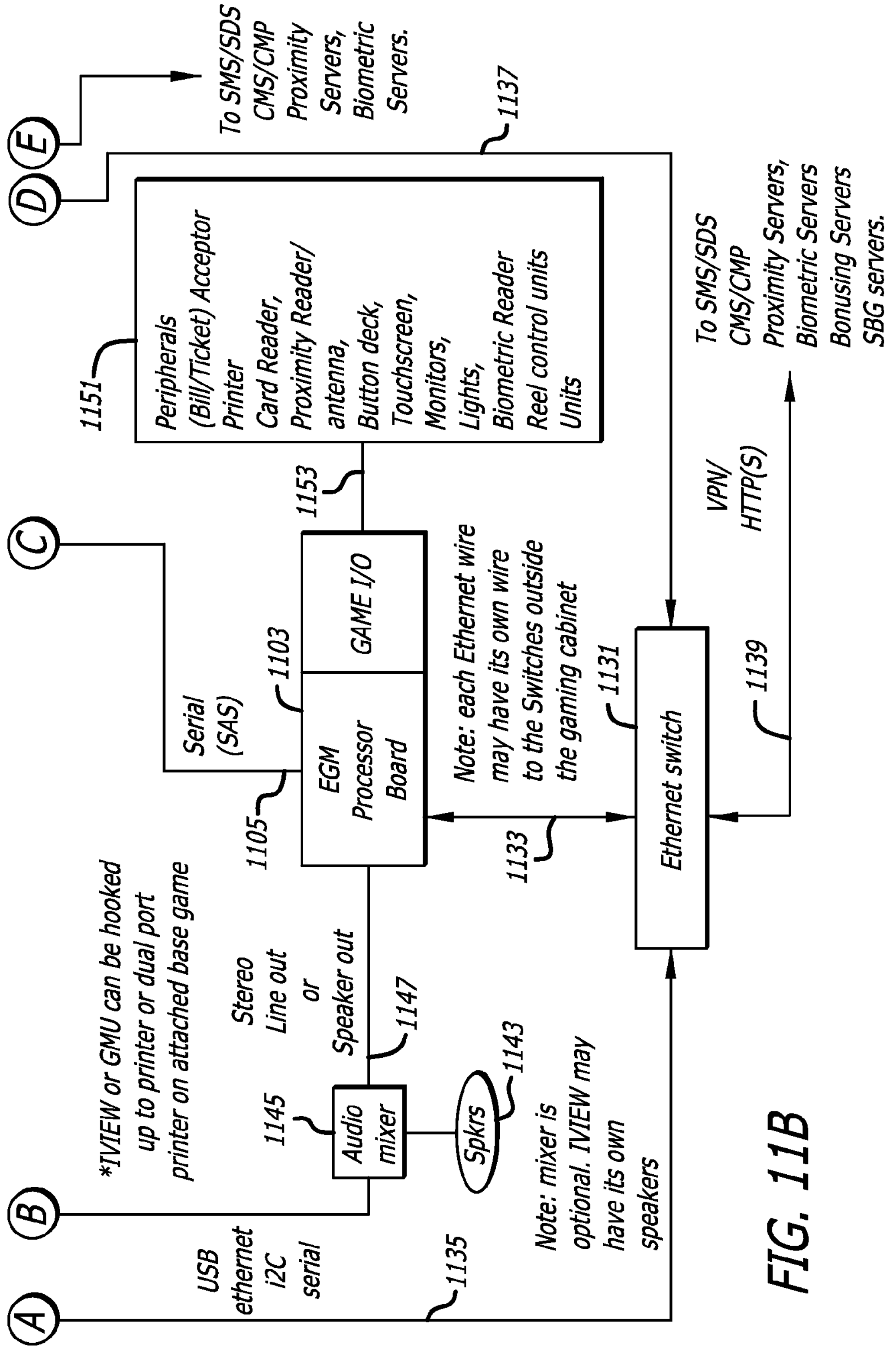
FIG. 11B illustrates a block diagram of the physical and logical components of the gaming machine of FIG. 10 in accordance with one or more embodiments.

Referring to FIGS. 11A and 11B, electronic gaming machine 1201 is shown in accordance with one or more embodiments. Electronic gaming machine 1201 includes base game integrated circuit board 1203 (EGM Processor Board) connected through serial bus line 1205 to game monitoring unit (GMU) 1207 (such as a Bally MC300 or ACSC NT), and player interface integrated circuit board (PIB) 1209 connected to player interface devices 1211 over bus lines 1213, 1215, 1217, 1219, 1221, 1223. Printer 1225 is connected to PIB 1209 and GMU 1207 over bus lines 1227, 1229. Base game integrated circuit board 1203, PIB 1209, and GMU 1207 connect to Ethernet switch 1231 over bus lines 1233, 1235, 1237. Ethernet switch 1231 connects to a slot management system (SMS) and a casino management system (CMS) network over bus line 1239. GMU 1207 also may connect to the SMS and CMS network over bus line 1241. Speakers 1243 connect through audio mixer 1245 and bus lines 1247, 1249 to base game integrated circuit board 1203 and PIB 1209. The proximity and biometric devices and circuitry may be installed by upgrading a commercially available PIB 1209, such as a Bally iView™ unit. Coding executed on base game integrated circuit board 1203, PIB 1209, and/or GMU 1207 may be upgraded to integrate a game in accordance with one or more embodiments described herein, as is more fully described below.

Peripherals 1251 connect through I/O board 1253 to base game integrated circuit board 1203. For example, a bill/ticket acceptor is typically connected to a game input-output board 1253 which is, in turn, connected to a conventional central processing unit ("CPU") base game integrated circuit board 1203, such as an Intel Pentium microprocessor mounted on a gaming motherboard. I/O board 1253 may be connected to base game integrated circuit board 1203 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 1203 executes a game program that causes base game integrated circuit board 1203 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 1253 to base game integrated circuit board 1203 which, in turn, assigns an appropriate number of credits for play in accordance with the game program. The player may further control the operation of the gaming machine by way of other peripherals 1251, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 1200; for example, it may be part of a central determination host system which provides random game outcomes to the game program. Thereafter, the player may or may not interact with the game through electromechanical or touch screen buttons to change the displayed indicia. Finally, base game integrated circuit board 1203 under control of the game program and OS compares the final display of indicia to a pay table. The set of possible game outcomes may include a subset of outcomes related to the triggering of a feature game. In the event the displayed outcome is a member of this subset, base game integrated circuit board 1203, under control of the game program and by way of I/O Board 1253, may cause feature game play to be presented on a feature display.

Predetermined payout amounts for certain outcomes, including feature game outcomes, are stored as part of the game program. Such payout amounts are, in response to instructions from base game integrated circuit board 1203, provided to the player in the form of coins, credits or currency via I/O board 1253 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 1207 includes an integrated circuit board and GMU processor and memory including coding for network communications, such as the G2S (game-to-system) protocol from the Gaming Standards Association, Las Vegas, Nev., used for system communications over the network. As shown, GMU 1207 may connect to card reader 1255 through bus 1257 and may thereby obtain player card information and transmit the information over the network through bus 1241. Gaming activity information may be transferred by the base game integrated circuit board 1203 to GMU 1207 where the information may be translated into a network protocol, such as S2S, for transmission to a server, such as a player tracking server, where information about a player's playing activity may be stored in a designated server database.

PIB 1209 includes an integrated circuit board, PID processor, and memory which includes an operating system, such as Windows CE, a player interface program which may be executable by the PID processor together with various input/output (I/O) drivers for respective devices which connect to PIB 1209, such as player interface devices 1211, and which may further include various games or game components playable on PIB 1209 or playable on a connected network server and PIB 1209 is operable as the player interface. PIB 1209 connects to card reader 1255 through bus 1223, display 1259 through video decoder 1261 and bus 1221, such as an LVDS or VGA bus.

As part of its programming, the PID processor executes coding to drive display 1259 and provide messages and information to a player. Touch screen circuitry interactively connects display 1259 and video decoder 1261 to PIB 1209, such that a player may input information and cause the information to be transmitted to PIB 1209 either on the player's initiative or responsive to a query by PIB 1209. Additionally soft keys 1265 connect through bus 1217 to PIB 1209 and operate together with display 1259 to provide information or queries to a player and receive responses or queries from the player. PIB 1209, in turn, communicates over the CMS/SMS network through Ethernet switch 1231 and busses 1235, 1239 and with respective servers, such as a player tracking server.

Player interface devices 1211 are linked into the virtual private network of the system components in gaming machine 1201. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iView™ processing board and game monitoring unit (GMU) processing board. The GMU and iView™ can be combined into one like the commercially available Bally GTM iView device. This device may have a video mixing technology to mix the EGM processor's video signals with the iView display onto the top box monitor or any monitor on the gaming device.

Figure 12:
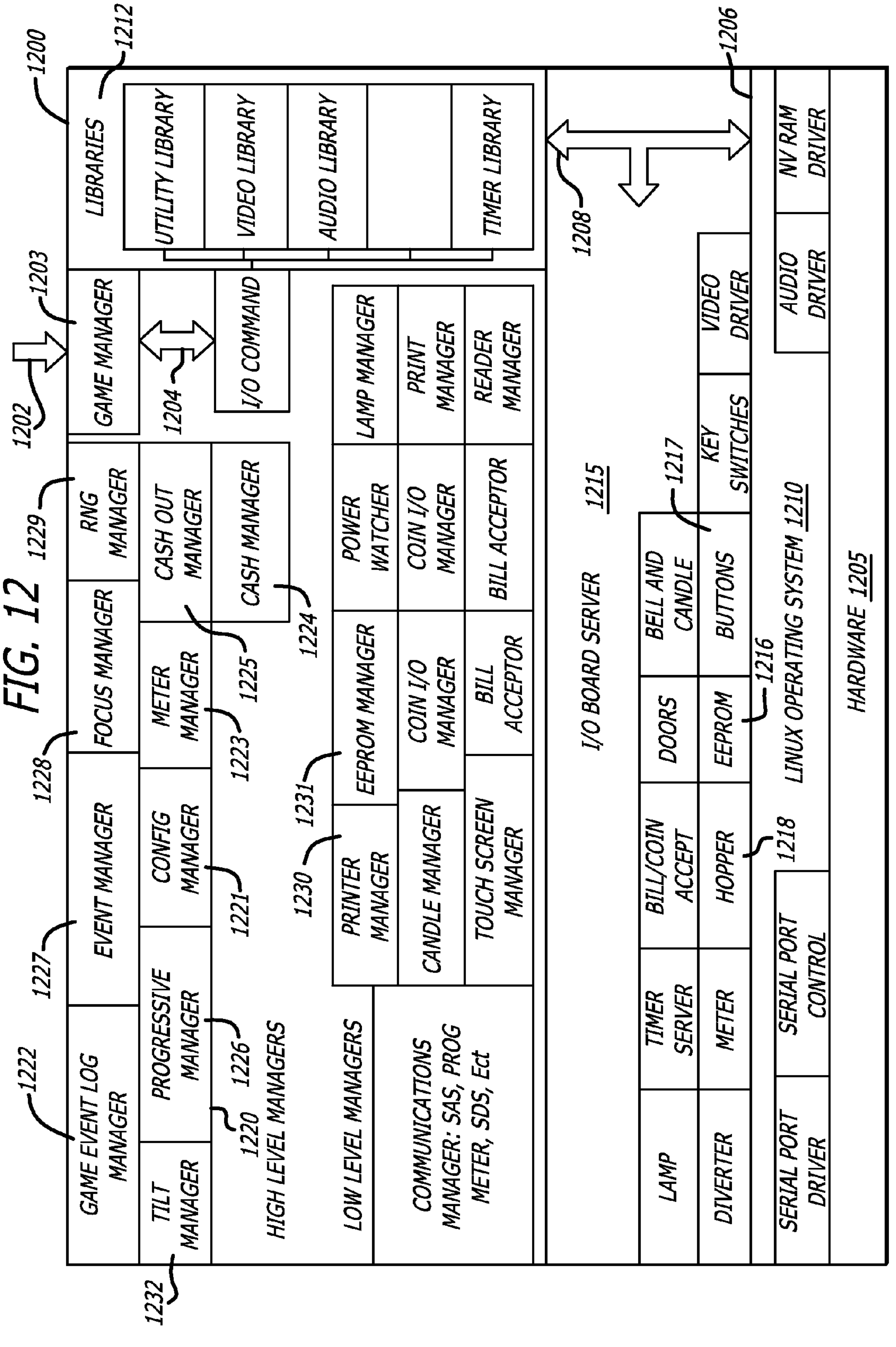
FIG. 12 illustrates a block diagram of the logical components of a gaming kernel in accordance with one or more embodiments.

In accordance with one or more embodiments, FIG. 12 is a functional block diagram of a gaming kernel 1300 of a game program under control of base game integrated circuit board 1303. The game program uses gaming kernel 1300 by calling into application programming interface (API) 1302, which is part of game manager 1303. The components of game kernel 1300 as shown in FIG. 12 are only illustrative, and should not be considered limiting. For example, the number of managers may be changed, additional managers may be added or some managers may be removed in other embodiments.

As shown in the example, there are three layers: a hardware layer 1305; an operating system layer 1310, such as, but not limited to, Linux; and a game kernel layer 1300 having game manager 1303 therein. In one or more embodiments, the use of a standard operating system 1310, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 1300 executes at the user level of the operating system 1310, and itself contains a major component called the I/O Board Server 1315. To properly set the bounds of game application software (making integrity checking easier), all game applications interact with gaming kernel 1300 using a single API 1302 in game manager 1303. This enables game applications to make use of a well-defined, consistent interface, as well as making access points to gaming kernel 1300 controlled, where overall access is controlled using separate processes.

For example, game manager 1303 parses an incoming command stream and, when a command dealing with I/O comes in (arrow 1304), the command is sent to an applicable library routine 1312. Library routine 1312 decides what it needs from a device, and sends commands to I/O Board Server 1315 (see arrow 1308). A few specific drivers remain in operating system 1310's kernel, shown as those below line 1306. These are built-in, primitive, or privileged drivers that are (i) general (ii) kept to a minimum and (iii) are easier to leave than extract. In such cases, the low-level communications is handled within operating system 1310 and the contents passed to library routines 1312.

Thus, in a few cases library routines may interact with drivers inside operating system 1310, which is why arrow 1308 is shown as having three directions (between library utilities 1312 and I/O Board Server 1315, or between library utilities 1312 and certain drivers in operating system 1310). No matter which path is taken, the logic needed to work with each device is coded into modules in the user layer of the diagram. Operating system 1310 is kept as simple, stripped down, and common across as many hardware platforms as possible. The library utilities and user-level drivers change as dictated by the game cabinet or game machine in which it will run. Thus, each game cabinet or game machine may have an base game integrated circuit board 1303 connected to a unique, relatively dumb, and as inexpensive as possible I/O adapter board 1340, plus a gaming kernel 1300 which will have the game-machine-unique library routines and I/O Board Server 1315 components needed to enable game applications to interact with the gaming machine cabinet. Note that these differences are invisible to the game application software with the exception of certain functional differences (i.e., if a gaming cabinet has stereo sound, the game application will be able make use of API 1302 to use the capability over that of a cabinet having traditional monaural sound).

Game manager 1303 provides an interface into game kernel 1300, providing consistent, predictable, and backwards compatible calling methods, syntax, and capabilities by way of game application API 1302. This enables the game developer to be free of dealing directly with the hardware, including the freedom to not have to deal with low-level drivers as well as the freedom to not have to program lower level managers 1330, although lower level managers 1330 may be accessible through game manager 1303's interface 1302 if a programmer has the need. In addition to the freedom derived from not having to deal with the hardware level drivers and the freedom of having consistent, callable, object-oriented interfaces to software managers of those components (drivers), game manager 1303 provides access to a set of upper level managers 1320 also having the advantages of consistent callable, object-oriented interfaces, and further providing the types and kinds of base functionality required in casino-type games. Game manager 1303, providing all the advantages of its consistent and richly functional interface 1302 as supported by the rest of game kernel 1300, thus provides a game developer with a multitude of advantages.

Game manager 1303 may have several objects within itself, including an initialization object (not shown). The initialization object performs the initialization of the entire game machine, including other objects, after game manager 1303 has started its internal objects and servers in appropriate order. In order to carry out this function, the kernel's configuration manager 1321 is among the first objects to be started; configuration manager 1321 has data needed to initialize and correctly configure other objects or servers.

The upper level managers 1320 of game kernel 1300 may include game event log manager 1322 which provides, at the least, a logging or logger base class, enabling other logging objects to be derived from this base object. The logger object is a generic logger; that is, it is not aware of the contents of logged messages and events. The log manager's (1322) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 1323 manages the various meters embodied in the game kernel 1300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 1323 receives its initialization data for the meters, during start-up, from configuration manager 1321. While running, the cash in (1324) and cash out (1325) managers call the meter manager's (1323) update functions to update the meters. Meter manager 1323 will, on occasion, create backup copies of the soft meters by storing the soft meters' readings in EEPROM. This is accomplished by calling and using EEPROM manager 1331.

In accordance with still other embodiments, progressive manager 1326 manages progressive games playable from the game machine. Event manager 1327 is generic, like log manager 1322, and is used to manage various gaming machine events. Focus manager 1328 correlates which process has control of various focus items. Tilt manager 1332 is an object that receives a list of errors (if any) from configuration manager 1321 at initialization, and during game play from processes, managers, drivers, etc. that may generate errors. Random number generator manager 1329 is provided to allow easy programming access to a random number generator (RNG), as a RNG is required in virtually all casino-style (gambling) games. RNG manager 1329 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 1325 has the responsibility of configuring and managing monetary output devices. During initialization, cash out manager 1325, using data from configuration manager 1321, sets the cash out devices correctly and selects any selectable cash out denominations. During play, a game application may post a cash out event through the event manager 1327 (the same way all events are handled), and using a call-back posted by cash out manager 1325, cash out manager 1325 is informed of the event. Cash out manager 1325 updates the credit object, updates its state in non-volatile memory, and sends an appropriate control message to the device manager that corresponds to the dispensing device. As the device dispenses dispensable media, there will typically be event messages being sent back and forth between the device and cash out manager 1325 until the dispensing finishes, after which cash out manager 1325, having updated the credit manager and any other game state (such as some associated with meter manager 1323) that needs to be updated for this set of actions, sends a cash out completion event to event manager 1327 and to the game application thereby. Cash in manager 1324 functions similarly to cash out manager 1325, only controlling, interfacing with, and taking care of actions associated with cashing in events, cash in devices, and associated meters and crediting.

In a further example, in accordance with one or more embodiments, I/O server 1315 may write data to the gaming machine EEPROM memory, which is located in the gaming machine cabinet and holds meter storage that must be kept even in the event of power failure. Game manager 1303 calls the I/O library functions to write data to the EEPROM. The I/O server 1315 receives the request and starts a low priority EEPROM thread 1316 within I/O server 1315 to write the data. This thread uses a sequence of 8 bit command and data writes to the EEPROM device to write the appropriate data in the proper location within the device. Any errors detected will be sent as IPC messages to game manager 1303. All of this processing is asynchronous.

In accordance with one embodiment, button module 1317 within I/O server 1315, polls (or is sent) the state of buttons every 2 ms. These inputs are debounced by keeping a history of input samples. Certain sequences of samples are required to detect a button was pressed, in which case the I/O server 1315 sends an inter-process communication event to game manager 1303 that a button was pressed or released. In some embodiments, the gaming machine may have intelligent distributed I/O which debounces the buttons, in which case button module 1317 may be able to communicate with the remote intelligent button processor to get the button events and simply relay them to game manager 1303 via IPC messages. In still another embodiment, the I/O library may be used for pay out requests from the game application. For example, hopper module 1318 must start the hopper motor, constantly monitor the coin sensing lines of the hopper, debounce them, and send an IPC message to the game manager 1303 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 13A:
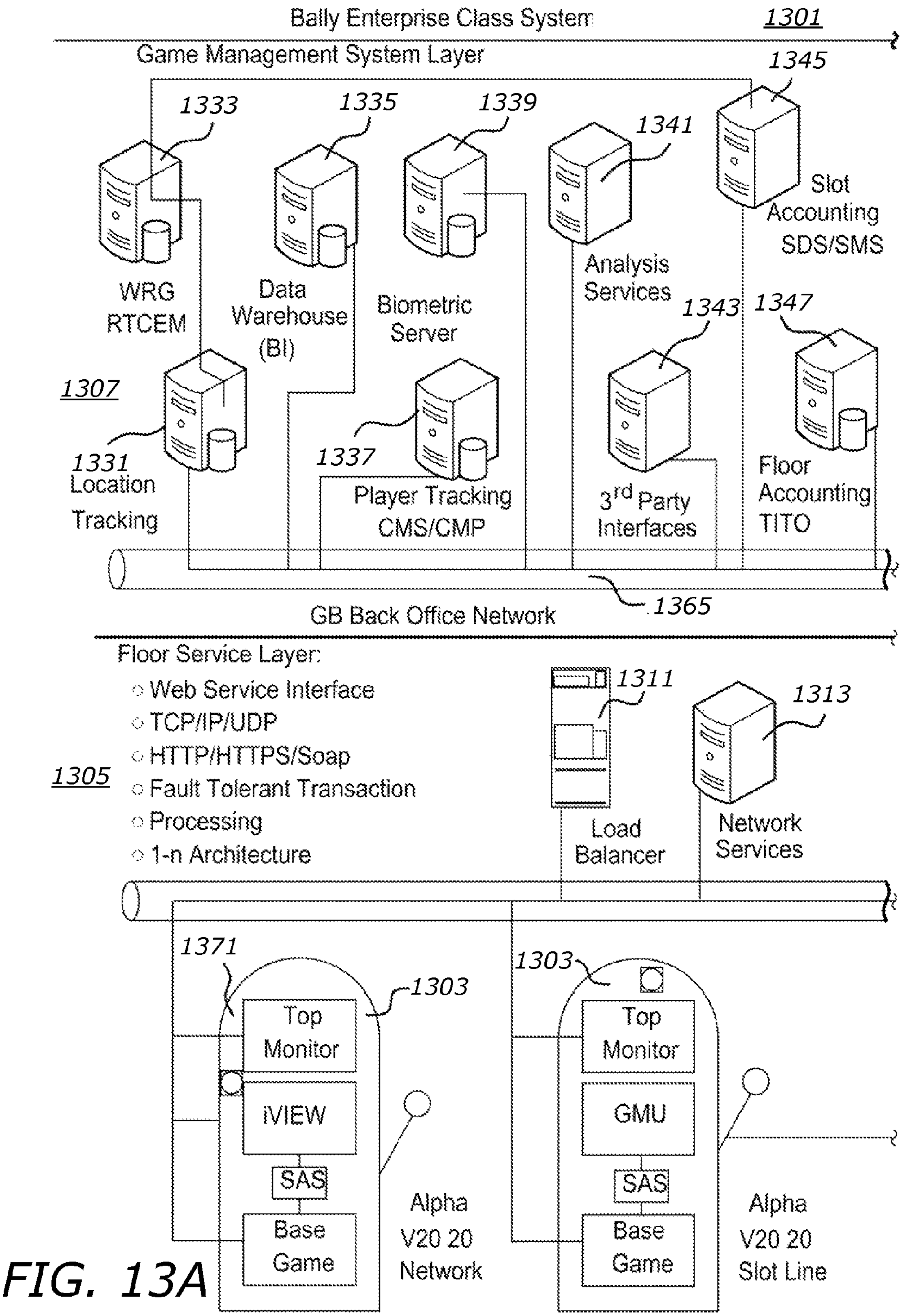
FIG. 13A illustrates a schematic block diagram showing the hardware elements of a networked gaming system in accordance with one or more embodiments.
Figure 13B:
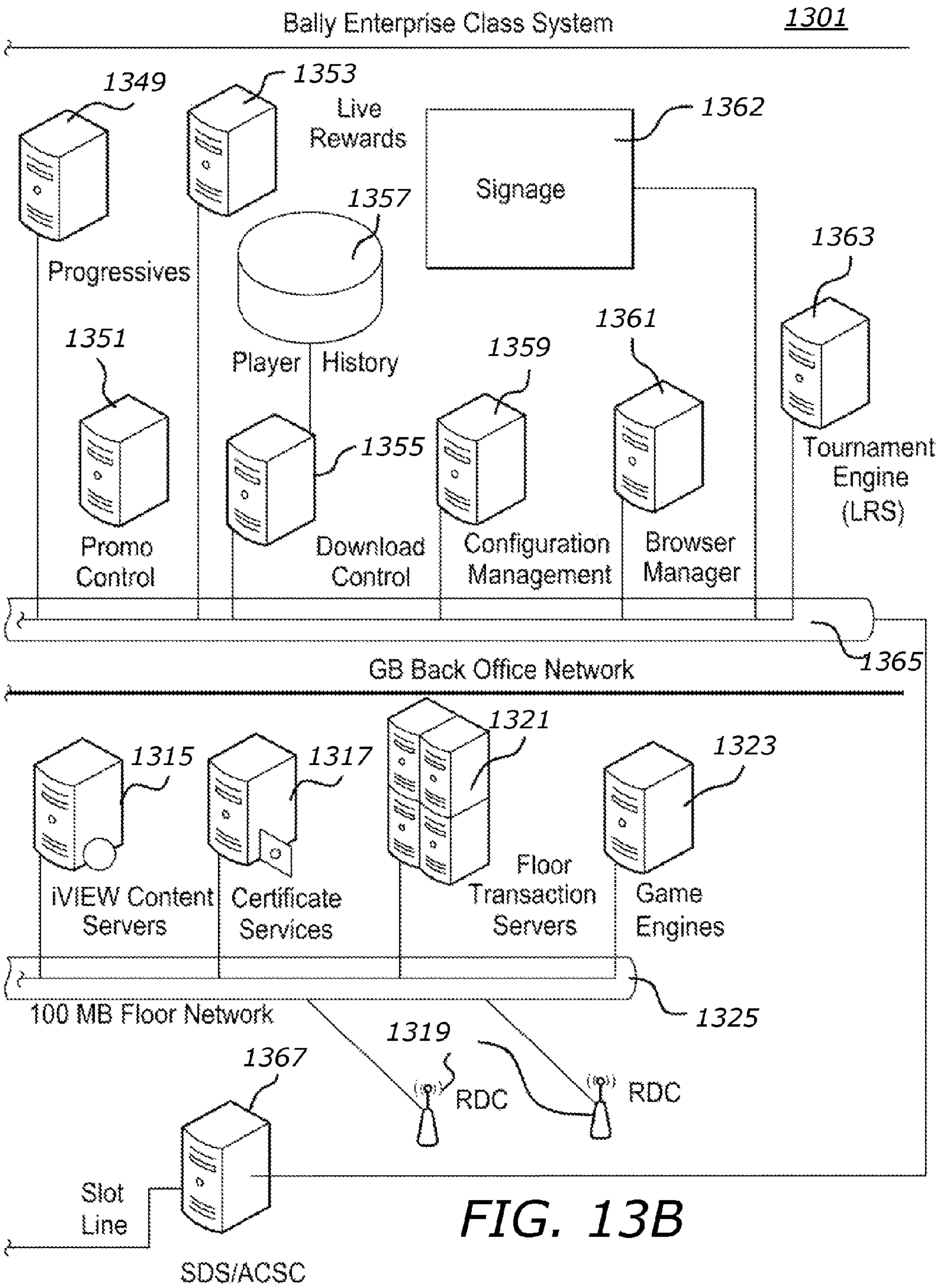
FIG. 13B illustrates a schematic block diagram showing the hardware elements of a networked gaming system in accordance with one or more embodiments.

Referring to FIGS. 13A and 13B, enterprise gaming system 1401 is shown in accordance with one or more embodiments. Enterprise gaming system 1401 may include one casino or multiple locations and generally includes a network of gaming machines 1403, floor management system (SMS) 1405, and casino management system (CMS) 1407. SMS 1405 may include load balancer 1411, network services servers 1413, player interface (iView) content servers 1415, certificate services server 1417, floor radio dispatch receiver/transmitters (RDC) 1419, floor transaction servers 1421 and game engines 1423, each of which may connect over network bus 1425 to gaming machines 1403. CMS 1407 may include location tracking server 1431, WRG RTCEM server 1433, data warehouse server 1435, player tracking server 1437, biometric server 1439, analysis services server 1441, third party interface server 1443, slot accounting server 1445, floor accounting server 1447, progressives server 1449, promo control server 1451, feature game (such as Bally Live Rewards) server 1453, download control server 1455, player history database 1457, configuration management server 1459, browser manager 1461, tournament engine server 1463 connecting through bus 1465 to server host 1467 and gaming machines 1403. The various servers and gaming machines 1403 may connect to the network with various conventional network connections (such as, for example, USB, serial, parallel, RS485, Ethernet). Additional servers which may be incorporated with CMS 1407 include a responsible gaming limit server (not shown), advertisement server (not shown), and a control station server (not shown) where an operator or authorized personnel may select options and input new programming to adjust each of the respective servers and gaming machines 1403. SMS 1405 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 1403 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 1407 and/or SMS 1405 servers and devices, firmware, media, operating systems, and configurations may be downloaded to the system components of respective gaming machines for upgrading or managing floor content and offerings in accordance with operator selections or automatically depending upon CMS 1407 and SMS 1405 master programming. The data and programming updates to gaming machines 1403 are authenticated using conventional techniques prior to install on the system components.

In various embodiments, any of the gaming machines 1403 may be a mechanical reel spinning slot machine or a video slot machine or a gaming machine offering one or more of the above described games including a group play game. Alternately, gaming machines 1403 may provide a game with a simulated musical instrument interface as a primary or base game or as one of a set of multiple primary games selected for play by a random number generator. A gaming system of the type described above also allows a plurality of games in accordance with the various embodiments to be linked under the control of a group game server (not shown) for cooperative or competitive play in a particular area, carousel, casino or between casinos located in geographically separate areas. For example, one or more examples of group games under control of a group game server are disclosed in U.S. Patent Publication No. 20080139305, entitled "Networked System and Method for Group Play Gaming," filed on Nov. 9, 2007, which is hereby incorporated by reference in its entirety for all purposes.

Figure 14:
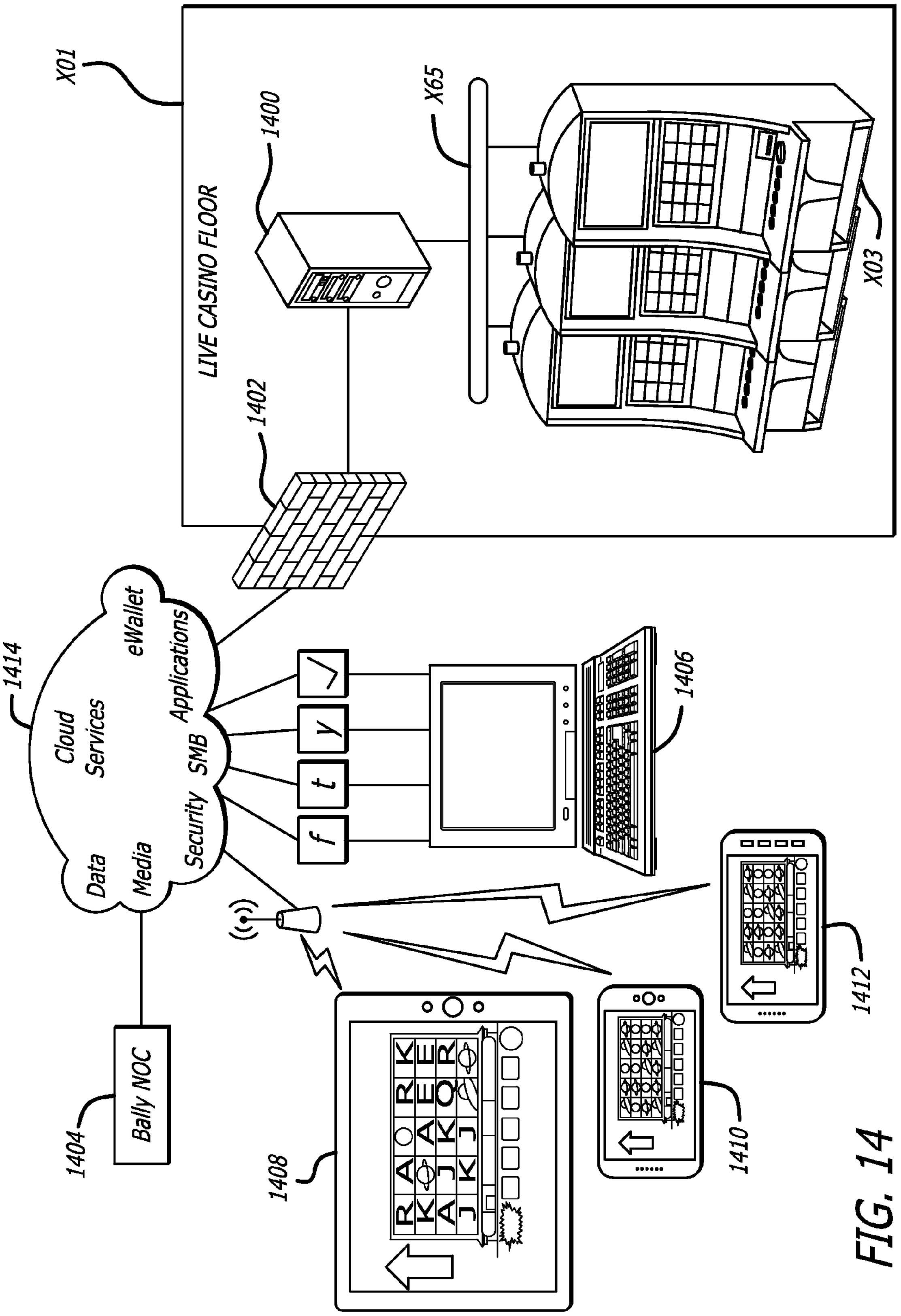
FIG. 14 illustrates a diagram showing an example of architecture for tying a casino enterprise network to an external provider of games and content to Internet or broadband communication capable devices.

All or portions of the disclosed embodiments may also be implemented or promoted by or through a system as suggested in FIG. 14. At 1401 is the gaming system of FIGS. 13A and 13B, which may be hosted at a casino property enterprise, across several casino enterprises or by a third party host. As described above, the gaming system 1401 has a network communication bus 1465 providing for communication between the gaming terminals 1403 and various servers. To provide the functionality illustrated in FIG. 14, a bonusing server 1500, such as a Bally Elite Bonusing Server is connected to the network communication bus 1465 (FIGS. 13A and 13B) for communication to the gaming system 1401, the gaming terminals 1403 and the various servers and other devices as described above. Through a secure network firewall 1502 the bonusing server 1500 is in communication with a cloud computing/storage service 1504 which may be hosted by the casino enterprise, a licensed third party or if permitted by gaming regulators an unlicensed provider. For example the cloud service 1504 may be as provided by Microsoft® Private Cloud Solutions offered by Microsoft Corp. of Redmond, Wash., USA. The cloud service 1504 provides various applications which can be accessed and delivered to, for example, personal computers 1506, portable computing devices such as computer tablets 1508, personal digital assistants (PDAs) 1510 and cellular devices 1512 such as telephones and smart phones. As but an example, the cloud service 1504 may store and host an eWallet application, casino or player-centric applications such as downloadable or accessible applications including games, promotional material or applications directed to and/or affecting a casino customers interaction with a casino enterprise (such as accessing the players casino account, establishing casino credit or the like), providing bonuses to players through system wide bonusing (SMB) or specific bonusing or comps to players, or other applications. The cloud service 1504 includes security provide for secure communication with the cloud service 1504 between the player/users and the cloud service 1504 and between the cloud service 1504 and the gaming system 1401. Security applications may be through encryption, the use of personal identification numbers (PINS) or other devices and systems. As suggested in FIG. 14, the cloud service 1514 stores player/user data retrieved from players/users and from the gaming system 1401.

The players/users may access the cloud service 1504 and the applications and data provided thereby through the Internet or through broadband wireless cellular communication systems and any intervening sort range wireless communication such as WiFi. The players/users may access the applications and data through various social media offerings such as Facebook, Twitter, Yelp, MySpace, LinkedIn or the like.

As but an example, a player/user may have a player account with a casino enterprise Z. That account may include data such as the player's credit level, their rating and their available comps. The account may further track any certificates, and the present value thereof, the player may have won as a result of the playing a game according to the disclosed embodiments. At their smart phone 1512 the player/user sends a request to the clout service 1504 (perhaps through a previously downloaded application) to request the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN. The cloud service 1004 forwards the inquiry to the bonusing servicer 1500 which, in turn, confirms the PIN and retrieves the requested information from the data warehouse 1435 (FIGS. 13A & 13B) or player tracking CMS/CMP server 1437 (FIGS. 13A & 13B). Alternatively the data may be stored in the cloud service 1504 and routinely updated from the data warehouse 1435 or player tracking CMS/CMP server 1437. In this instance the request would be responded to from data residing with the cloud service 1504. The information is formatted by the cloud server 1504 application and delivered to the player/user. The delivery may be formatted based upon the player/user's device operating system (OS), display size or the like.

The cloud service 1500 may also host game applications to provide virtual instances of games for free, promotional, or where permitted, P2P (Pay to Play) supported gaming. Third party developers may also have access to placing applications with the cloud service 1504 through, for example a national operations center (Bally NOC 1514). A game software manufacturer such as Bally Gaming, Inc. may also provide game applications on its own or on behalf of the casino enterprise.

Other media such as advertising, notices (such as an upcoming tournament) may also be provided to the cloud service 1504. When a player/user accesses the cloud service 1504 certain media may be delivered to the player/user in a manner formatted for their application and device.

The foregoing description, for purposes of explanation, uses specific nomenclature and formula to provide a thorough understanding of the disclosed embodiments. It should be apparent to those of skill in the art that the specific details are not required in order to practice the disclosed embodiments. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed:

1. A method of calibrating a location of a player's gaze at a video display comprising:

providing, by a least one processor, game play on a display of a gaming machine, the game play including a serial display of game video content having a plurality of reference symbols and non- reference symbols displayed on the display;

capturing, by at least one image capturing device coupled to the gaming machine, images of the player's gaze while displaying the plurality of reference symbols at positions on the display during the serial display of the game video content;

creating, by the at least one processor, control signals representing a direction of the player's gaze relative to the positions of the plurality of reference symbols;

creating, by the at least one processor, a data set based on the control signals and the positions of the plurality of reference symbols;

calibrating, by the at least one processor, the location of the player's gaze at the display of the gaming machine using the data set; and improving, by the at least one processor, calibration of the location of the player's gaze by removing a weakest member of the data set and replacing the weakest member with new calibration event data, wherein the weakest member is determined based upon a spread size of raw gaze data, with a small spread she being better, and a shortness of time of a fixation event, with a shorter time indicating less accuracy.

2. The method of claim 1, wherein the plurality of reference symbols have a greater significance to the game play on the gaming machine than the non-reference symbols displayed on the display of the gaming machine.

3. The method of claim 1, wherein the serial display of the game video content includes a spinning reel game.

4. The method of claim 3, wherein at least one of the plurality of reference symbols is selected from a group consisting of a Wild symbol and a Jackpot symbol.

5. The method of claim 1, wherein at least one of the plurality of reference symbols is animated.

6. The method of claim 1, further comprising:

providing an audio cue through speakers of the gaming machine; and capturing images of the player's gaze while providing the audio cue.

7. The method of claim 1, further comprising saving the data set in a profile for the player.

8. The method of claim 1, wherein capturing images of the player's gaze includes capturing images of the player's left and right eye.

9. A method for tracking a location of a player's eye at a video display comprising:

providing, by at least one processor, game play on a display of a gaming machine, the game play including a serial display of game video content;

capturing, by an image capturing device coupled to the gaming machine, images of the player's eye during game play;

storing, by a memory device coupled to the gaming machine, captured images of the player's eye when an indicator for a calibration point is displayed on the display of the gaming machine during game play;

creating, by at least one processor, control signals representing the location of the player's eye relative to a position of the indicator displayed on the display of the gaming machine;

processing, by the at least one processor, the control signals and the position of the indicator on the display to develop a data set;

calibrating, by the at least one processor, a location of a gaze of the player's eye at the display of the gaming machine using the data set; and improving, by the at least one processor, calibration of the location of the phyer's gaze by removing a weakest member of the data set and replacing the weakest member with new calibration event data, wherein the weakest member is determined based upon a spread size of raw gaze data, with a small spread size being better, and a shortness of time of a fixation event, with a shorter time indicating less accuracy.

10. The method of claim 9, wherein the indicator for the calibration point is a special gaming symbol with a greater significance to the game play on the gaming machine than a non-special gaming symbol on the display of the gaming machine.

11. The method of claim 10, wherein the special gaming symbol is selected from a group consisting of a Wild symbol and a Jackpot symbol.

12. The method of claim 10, wherein the special gaming symbol is an animation.

13. The method of claim 9, wherein the display of the gaming machine is a touchscreen display and the indicator for the calibration point is the location of a touch on the touchscreen display.

14. The method of claim 13, further comprising storing captured images of the player's eye preceding the occurrence of the indicator for the calibration point.

15. The method of claim 14, wherein storing captured images of the player's eye 0.5 seconds before the occurrence of the indicator for the calibration point.

16. The method of claim 9, further comprising saving the data set in a profile for the player.

17. A system for calibrating a player's gaze during game play, comprising:

a gaming machine including a display, the gaming machine providing game video content on the display, and the gaming machine providing a plurality of reference symbols and non-reference symbols on the display during game play, wherein the plurality of reference symbols have a greater significance to the game play than the plurality of non-reference symbols;

a camera positioned adjacent to the display of the gaming machine, wherein the camera captures images of the player's gaze when at least one of the plurality of reference symbols is displayed on the display of the gaming machine;

a memory device in communication with the camera that stores images of the player's gaze when at least one of the plurality of reference symbols is displayed; and a processor in communication with the gaming machine and the memory device, the processor creating a data set based on the stored images and one or more positions on the display of the at least one of the plurality of reference symbols, wherein the data set represents a location at the display of the player's gaze;

wherein a calibration of the location of the player's gaze is improved by removing a weakest member of the data set and replacing the weakest member with new calibration event data, wherein the weakest member is determined based upon a spread size of raw gaze data, with a small spread size being better, and a shortness of time of a fixation event, with a shorter time indicating less accuracy.

18. The system of claim 17, wherein the memory device and processor are associated with a remote server.

19. The system of claim 18, wherein the remote server is in communication with multiple gaming machines.

20. the method of claim 19, wherein the memory device stores the data set created by the processor in a profile for the player.

* * * * *